(12) United States Patent
Kuraishi et al.

(10) Patent No.: US 10,013,288 B2
(45) Date of Patent: Jul. 3, 2018

(54) DATA STAGING MANAGEMENT SYSTEM

(71) Applicant: FUJITSU LIMITED, Kawasaki-shi, Kanagawa (JP)

(72) Inventors: Hideaki Kuraishi, London (GB); Akira Ishisaka, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

(21) Appl. No.: 14/927,630

(22) Filed: Oct. 30, 2015

(65) Prior Publication Data

US 2016/0132357 A1 May 12, 2016

(30) Foreign Application Priority Data

Nov. 6, 2014 (EP) .................................. 14192070

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4843* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 6,557,073 B1 * | 4/2003 | Fujiwara | ............... | G06F 3/0601 711/111 |
| 7,448,022 B1 * | 11/2008 | Ram | ........................ | G06F 8/00 717/120 |
| 2003/0074387 A1 * | 4/2003 | Tanaka | .................. | G06F 9/5038 718/103 |
| 2008/0098395 A1 * | 4/2008 | Backer | .................. | G06F 9/4887 718/102 |
| 2009/0083746 A1 * | 3/2009 | Katsumata | .............. | G06F 9/485 718/103 |
| 2010/0299447 A1 * | 11/2010 | Salvi | ................... | G06F 11/2074 709/233 |
| 2011/0185305 A1 | 7/2011 | Lai et al. | | |

(Continued)

OTHER PUBLICATIONS

European Search Report dated Mar. 20, 2015 in corresponding European Application No. 14192070.2.

*Primary Examiner* — Hiren Patel
*Assistant Examiner* — Zhi Chen
(74) *Attorney, Agent, or Firm* — Staas & Halsey LLP (57) ABSTRACT

Batch job data staging combining synchronous/asynchronous staging. In pre-processing, a stage-in source file, and a target file for stage-out, in permanent storage, are identified using a batch script. From data amounts, time for stage-in/stage-out to/from temporary storage are estimated. Stage-in is based on the time, stage-out being asynchronous, and each asynchronous staging is classified short/long term depending on the time, each staging being recorded in a table. If a source file is modified, incremental staging is added to the table. With a staging list scheduling for batch jobs stage-in is performed, monitoring progress in the table, and resources may be allocated for the jobs nodes without waiting for stage-in to complete. The job generates results in the temporary storage, and using post-processing, stage-out transfers results to the target file in permanent storage.

14 Claims, 6 Drawing Sheets

(56) References Cited

U.S. PATENT DOCUMENTS

| | | | |
|---|---|---|---|
| 2013/0262683 A1* | 10/2013 | Hayashi | H04L 47/70 709/226 |
| 2013/0311744 A1* | 11/2013 | Kikkawa | G06F 12/023 711/170 |
| 2014/0052841 A1* | 2/2014 | Kanemasa | G06F 9/5083 709/224 |
| 2014/0137134 A1* | 5/2014 | Roy | G06F 9/5083 718/105 |
| 2014/0280703 A1 | 9/2014 | Vaks et al. | |

* cited by examiner

FIG. 1

(Prior Art)

| Batch job ID | Data staging ID | Predicted time for asynchronous short-term data staging processing [second] |
| --- | --- | --- |
| 1001 | 000 | 1800 |
| 1002 | 000 | 1500 |
| 1003 | 000 | 1800 |
| 1004 | 000 | 900 |
| 1005 | 000 | 1800 |
| 1006 | 000 | 1800 |
| 1007 | 000 | 1800 |
| 1008 | 000 | 900 |
| 1009 | 000 | 1800 |
| 1010 | 000 | 1500 |
| 1011 | 000 | 1800 |
| 1012 | 000 | 1800 |

FIG. 7

Multiplicity 2
(2 parallel processing for data staging)

| | | | | | | |
| --- | --- | --- | --- | --- | --- | --- |
| I/O server 1 | 1001 000 | 1003 000 | 1005 000 | 1007 000 | 1009 000 | 1011 000 |
| I/O server 2 | 1002 000 | 1004 000 | 1006 000 | 1008 000 | 1010 000 | 1012 000 |

FIG. 8

DATA STAGING MANAGEMENT SYSTEM

CROSS-REFERENCE TO RELATED APPLICATIONS

This application claims the benefit of European Application No. 14192070.2, filed Nov. 6, 2014, in the U.S. Intellectual Property Office, the disclosure of which is incorporated herein by reference.

BACKGROUND

1. Field

The present invention relates to data staging between temporary storage and permanent storage, particularly but not necessarily exclusively in high-performance computing (HPC) systems. More particularly, the present invention provides a data staging management system and a method of managing data staging in a computer system.

2. Description of the Related Art

HPC systems or clusters are widely used nowadays for computer simulation in various fields. However, it is often the case that end users with applications (or "jobs") to be executed, have to wait for a long time to acquire the necessary computing resources ("resources" here denoting CPUs, cores, memory and so forth), which means that computing resources are not efficiently used. One of the major problems causing this issue is a process called "data staging".

Batch job execution is often employed in HPC systems. A batch job consists of a predefined group of processing actions that require little or no interaction between users and the system. When a job is submitted by a user, it is placed in a queue where it waits until the system is ready to process the job. A job queue may contain many jobs, each specific job being made to wait until the system has processed jobs submitted earlier or having a higher priority. Since user interaction is not required, batch jobs can be accumulated during working hours and then execution can take place overnight. This form of execution can be contrasted with "interactive jobs" in which the user interacts with the system and user requests are acted on in real time.

In job execution in a HPC cluster environment, it is common practice to transfer input data to temporary storage whose I/O speed is very fast, from a permanent storage area before a job starts to run. Similar to such input data transfer, it is also common to transfer output data (that is, the results of executing the job) from temporary storage to a permanent storage area after a job terminates. This data transfer process is called "data staging" in the high performance computing field. Input and output data staging are referred to as "stage-in" and "stage-out" respectively.

Figure 1:
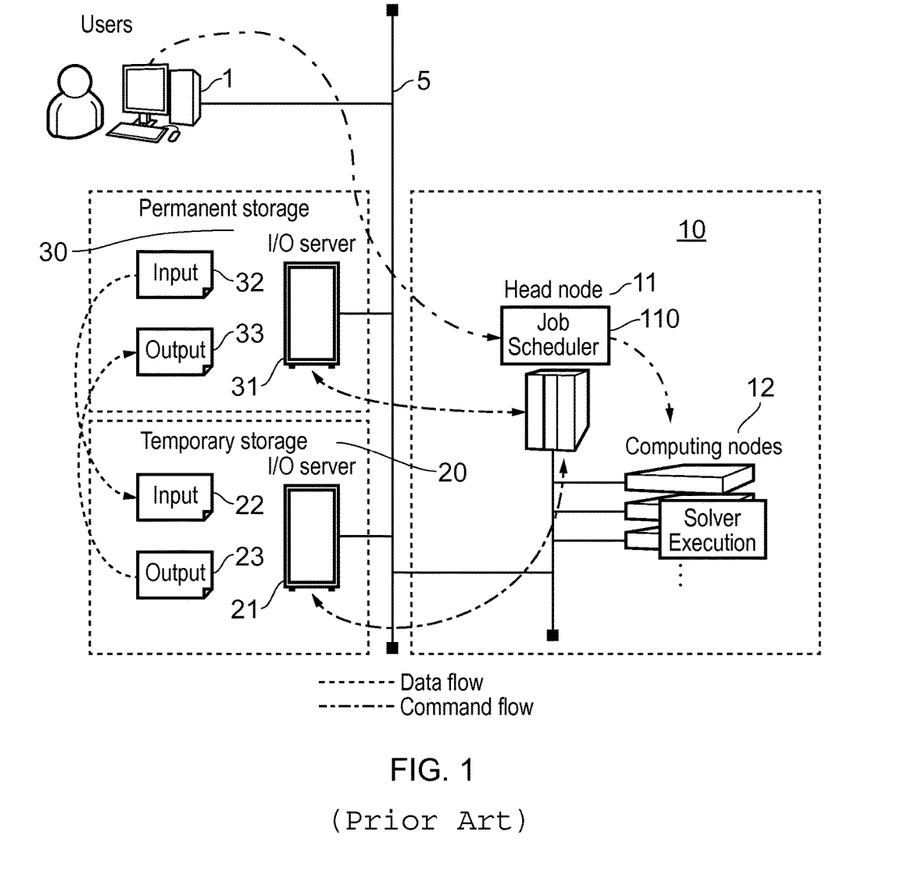
FIG. 1 shows a system overview of a computing system employing data staging as known in the art.

FIG. 1 shows a system overview of a HPC system employing data staging. A workstation 1 of an end user is connected via a network 5 to a HPC system 10 comprising a head node 11 and a possibly large number of computing nodes 12 for executing a job. The computing nodes 12 may be collectively referred to as a "solver" for the simulation task to be run, since simulation models generally involve the solution of many equations. The workstation 1 is just a representative example of a potentially very large number of users of system 10.

Simulation often involves the use of commercially-available models of physical phenomena, called "ISV applications" where ISV stands for Independent Software Vendor. Examples of such ISV applications employed by manufacturing companies and research institutes include MSC, CD-Adapco, and SIMILIA.

The HPC system 10 is linked via the network 5 with a temporary storage 20 equipped with its own I/O server 21, and to permanent storage 30 having an I/O server 31. The temporary storage 20 will normally be faster, of smaller capacity, and more local to the HPC system 10 compared with the permanent storage 30. Different storage technologies may also be involved: for example the temporary storage 20 may be solid-state whilst the permanent storage 30 may employ magnetic disks. Transfer between the two types of storage may be initiated, as indicated by dot-dash lines in FIG. 1, by commands from the head node 11, and managed by the I/O servers 21 and 31

The head node 11 contains a job scheduler 110 and is responsible for communications with the user workstation 1 and with I/O servers 21 and 31; it may, but need not, also provide one of the computing nodes.

In general, the job scheduler 110 manages both job execution order of a queue of batch jobs, and data staging associated with each batch job. There may be more than one "data staging job" associated with the same batch job—in particular a data first staging job for staging-in, and a second data staging job for stage-out. Multiple batch jobs may be executed simultaneously, depending on the computing resources demanded, and those available.

Firstly, the job scheduler 110 receives a job execution request from the user workstation 1 as indicated by the dot-dash line extending between the two, and places the job in a queue. The execution request takes the form of a "batch job script" specifying inter alia at least one target data file in the permanent storage 30, where the data for staging can be found. The job scheduler then checks the status of the availability of computing resources among the computing nodes 12. Data staging between the storages 20 and 30, upon command from the job scheduler and managed by the respective I/O servers 21 and 31, is conventionally carried out only after specified computing resources have been allocated to the job in the job scheduler 110. The data flow is indicated by dashed lines at the left hand side of the Figure, and respective storage areas 22, 32 and 23, 33 may be defined for each of the input (pre-execution) and output (post-execution) phases. Then, only after stage-in of the input data to the temporary storage 20 has completed without an error, the staged-in data can be supplied from temporary storage 20 to the computing nodes 12. The stage-in is performed under instruction from the head node 11, the data being transferred directly from the temporary storage 22 via the I/O server 21 to the computing nodes 12 which require the data, as determined by the job scheduler 110. Then, the main job starts to run.

However, the data staging processes carried out before and after solver job execution take a lot of time, leaving computing resources almost idle, which causes low machine efficiency and wastes electrical power. This kind of data staging is called "synchronous" data staging. Because the data staging is carried out after securing the necessary computing resource, the time for I/O processing (stage-in) increases as the target data size increases, which causes inefficient use of the computing resource. The time taken up by I/O processing has to be added on to the time the job is queued awaiting execution. During I/O processing, as already mentioned the computing nodes are almost idle.

In an attempt to ameliorate the above problem, so-called "asynchronous" data staging has been devised. In asynchronous data staging, before the necessary computing resource is allocated to a submitted job in the job scheduler, data staging is independently carried out in order to reduce inefficient use of computing resources during I/O processing. This allows at least some of the time while the job is queued to be put to use for stage-in of the input data. However, the following problems still exist.

Firstly, whilst a user waits for a job to be executed, there is the possibility that he/she changes the input data. In the case of asynchronous data staging, because it is difficult for a user to know the start-time of the input data staging, changing the input data during this waiting period is impossible. Secondly, if input data staging is scheduled using a first-in-first-out algorithm, the time taken for data staging increases and the allocation of compute nodes gets stacked as the amount of staging data increases. These problems arise both during stage-in and stage-out.

As the sophistication of simulation models grows, the amount of input and output data is rapidly increasing, with the result that the time taken up by stage-in and stage-out may account for a significant proportion of the overall run-time. Consequently, there is a need for a more efficient data staging mechanism between temporary storage and permanent storage.

SUMMARY

Additional aspects and/or advantages will be set forth in part in the description which follows and, in part, will be apparent from the description, or may be learned by practice of the invention.

According to a first aspect of the present invention, there is provided a method of managing data staging when executing batch jobs in a computer system, comprising steps of, for each batch job:

identifying at least one source file for data stage-in and at least one target file for data stage-out;

determining amounts of data to be transferred in data stage-in and data stage-out and estimating a time required for the data transfer;

setting, as a first data staging processing for the batch job, asynchronous or synchronous data stage-in on the basis of the estimated time required, and setting, as a second data staging processing for the batch job, asynchronous data stage-out;

performing the data stage-in from the source file and allocating resources for performing the batch job;

executing the batch job to generate results; and performing the data stage-out of the results to the target file.

Each data staging processing referred to here corresponds to a "data staging job" mentioned in the detailed description.

Here, the setting the first data staging processing as synchronous or asynchronous can be done by comparing the estimated time with a first threshold value. If the estimated time is within the threshold value, the data stage-in is set as synchronous, if not then asynchronous data stage-in is set. In any case, the data stage-out is preferably set to asynchronous.

Preferably, a further classification of asynchronous data staging processing into short-term or long-term is made as follows: classifying the first data staging processing as either asynchronous short-term or asynchronous long-term data stage-in according to the estimated time required for data stage-in; and classifying the second data staging processing as either asynchronous short-term or asynchronous long-term data stage-out according to the estimated time required for data stage-out. More particularly, the estimated time in each case may be compared with a second threshold value: if the estimated time is within the second threshold value, short-term is set; otherwise the data staging processing is classified as long-term.

Preferably, the allocating resources is performed before completing the data stage-in. That is, knowing the estimated time to complete data stage-in, if the remaining time required becomes less than the first threshold value mentioned above, then it is possible to start allocating resources to the job.

Thus, in one aspect the present invention provides a method of managing data staging when executing batch jobs in a computing system having permanent storage and temporary storage, the data staging comprising data stage-in wherein data is transferred from the permanent storage to the temporary storage and data stage-out wherein data is transferred from the temporary storage to the permanent storage, the method comprising steps of, for each batch job:

identifying at least one source file for data stage-in and at least one target file for data stage-out;

determining amounts of data to be transferred in data stage-in and data stage-out and estimating a time required to complete the data transfer;

setting, as a first data staging processing for the batch job, asynchronous or synchronous data stage-in on the basis of the estimated time required by comparing the estimated time with a threshold value such that if the estimated time is within the threshold value, the data stage-in is set as synchronous, and if not then the data stage-in is set as asynchronous;

setting, as a second data staging processing for the batch job, asynchronous data stage-out;

performing data stage-in from the source file and allocating resources for performing the batch job;

executing the batch job to generate results; and performing data stage-out of the results to the target file; wherein the allocating resources is performed once a remaining time to complete the data transfer is within the threshold value.

The method may further comprise:

setting a maximum time permitted for the data stage-in and/or the data stage-out;

calculating a multiplicity of data stage-in and/or data stage-out based on the maximum time; and performing the data stage-in and/or data stage-out of a plurality of batch jobs simultaneously with a number of data staging processings equal to said multiplicity.

Here, the calculation may involve dividing the maximum time by the total of the estimated times for data staging processings of a plurality of batch jobs. The result may be rounded up to arrive at an integer, which is the multiplicity.

In any method as defined above, the setting may include forming a data staging management table recording each data staging processing and the status of each.

Each data staging processing referred to so far may be termed an "initial" data staging processing. However, preferably the method further comprises, while performing data stage-in, checking whether the source file has been modified since the start of data stage-in and if so, setting an "incremental" data stage-in as an additional data staging processing in the table.

The data staging management table may be entered with, for each data staging processing, initial information including:

an identifier of the batch job for which the data staging processing is set;

an indication of whether the data staging processing is data stage-in or data stage-out;
a location of each source file or target file as the case may be; and
the amount of data to be transferred.

Here, the initial information is obtained by analyzing a batch job script to perform said identifying and estimating.

The data staging management table may further contain, for each data staging processing, such information as:
an indication of whether the data staging processing is an incremental data stage-in;
whether the data staging processing has not started, is ongoing, or has completed;
a start time of data staging processing;
an end time of data staging processing;
the amount of data so far transferred and/or the amount of data remaining to be transferred; and
the estimated time required for the data staging processing.

The estimated time may be counted down as the data staging processing progresses, to show the expected time remaining to complete data transfer.

The method may further comprise constructing, on the basis of the data staging management table, a data staging list for scheduling data stage-in or data stage-out of a plurality of batch jobs.

According to a second aspect of the present invention, there is provided a data staging manager for managing data staging in a computer system executing batch jobs, the data staging manager arranged to, for each batch job:
identify at least one source file for data stage-in and at least one target file for data stage-out;
determine amounts of data to be transferred in data stage-in and data stage-out and estimating a time required for the data transfer;
set, as a first data staging processing for the batch job, asynchronous or synchronous data stage-in on the basis of the estimated time required, and set, as a second data staging processing for the batch job, asynchronous data stage-out;
perform the data stage-in from the source file;
communicate with a job scheduler of the computer system to initiate allocation of resources to the batch job to allow execution of the batch job; and after the batch job has been executed,
perform the data stage-out of the results to the target file.

The data staging manager preferably comprises a data staging management server, coupled to a pre-processor and a post-processor installed in the job scheduler of the computer system, the pre-processor arranged to analyze a batch job script received by the job scheduler. The data staging management server may run various processes called "initiators" for performing (possibly in conjunction with separate data staging programs) the data stage-in or stage-out.

Further preferably, the data staging management server includes a data staging management table recording, for each data staging processing:
an identifier of the batch job for which the data staging processing is set;
an indication of whether the data staging processing is data stage-in or data stage-out;
a location of each source file or target file as the case may be;
the amount of data to be transferred;
an indication of whether the data staging processing is an incremental data stage-in;
whether the data staging processing has not started, is ongoing, or has completed;

a start time of data staging processing, if started;
an end time of data staging processing, if completed;
the amount of data so far transferred and/or the amount of data remaining to be transferred; and
the estimated time required.

According to a third aspect of the present invention, there is provided a computer program containing computer-readable instructions which, when executed by a server in a computer system, perform any method as defined above.

Such a computer program may be provided in the form of one or more non-transitive computer-readable recording media, or as a downloadable signal, or in any other form.

Thus, embodiments of the present invention provide a data staging management system (DSMS) which improves low machine efficiency, segregating computation and pre- or post-processing to copy input and output data to improve resource usage. Computing resource allocation and data staging are done with reference to job status information.

More particularly, embodiments of the present invention provide a data staging technique when executing batch jobs in a HPC system, combining synchronous and asynchronous data staging processing. At least one source file (target data file) for data stage-in, and a target file for data stage-out, are identified by analyzing a batch job script. From amounts of data contained in the files, a time required for data stage-in and data stage-out are estimated. Data stage-in is set as asynchronous or synchronous based on the estimated time, data stage-out being treated as asynchronous, and each asynchronous data staging processing is further classified as short-term or long-term depending on the estimated time required. The data stage-in is performed from the source file and resources are allocated for executing the batch job without waiting for data stage-in to complete. The batch job is executed to generate results, and data stage-out is performed to transfer the results to the target file.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

As mentioned in the introduction, when input data staging is carried out, computing resources are reserved for the corresponding job even though they are not being used for computing. Subsequent jobs in the queue must wait for earlier jobs to complete their data staging, even if a subsequent job has relatively modest data staging requirements. This makes occupied resources almost idle and brings about low resource usage. Also in output data staging, the same situation happens. Because the amount of transferred data may be huge, it takes a long time before a job starts to run, and occupied resources are held by the job until data staging is completed. To address this problem, embodiments of the present invention provide a solution combining synchronous and asynchronous data staging in order to avoid inefficient use of the computing resource.

As mentioned earlier, a job scheduler is conventionally used to secure computing resources to jobs and manage the job execution order. However, existing job schedulers do not control the data staging process required for a batch job execution, because it is out of the job scheduler's scope. The inventors have realised that it is desirable that a job scheduler is able to control the data staging processing according to the availability of computing resources in an integrated fashion. Accordingly, a feature of an embodiment of the present invention is a data staging management system coupled with a job scheduler in order to improve the efficient resource allocation and convenience for end users.

A specific embodiment will now be described by way of example only, with reference to FIGS. 2 to 8.

Figure 2:
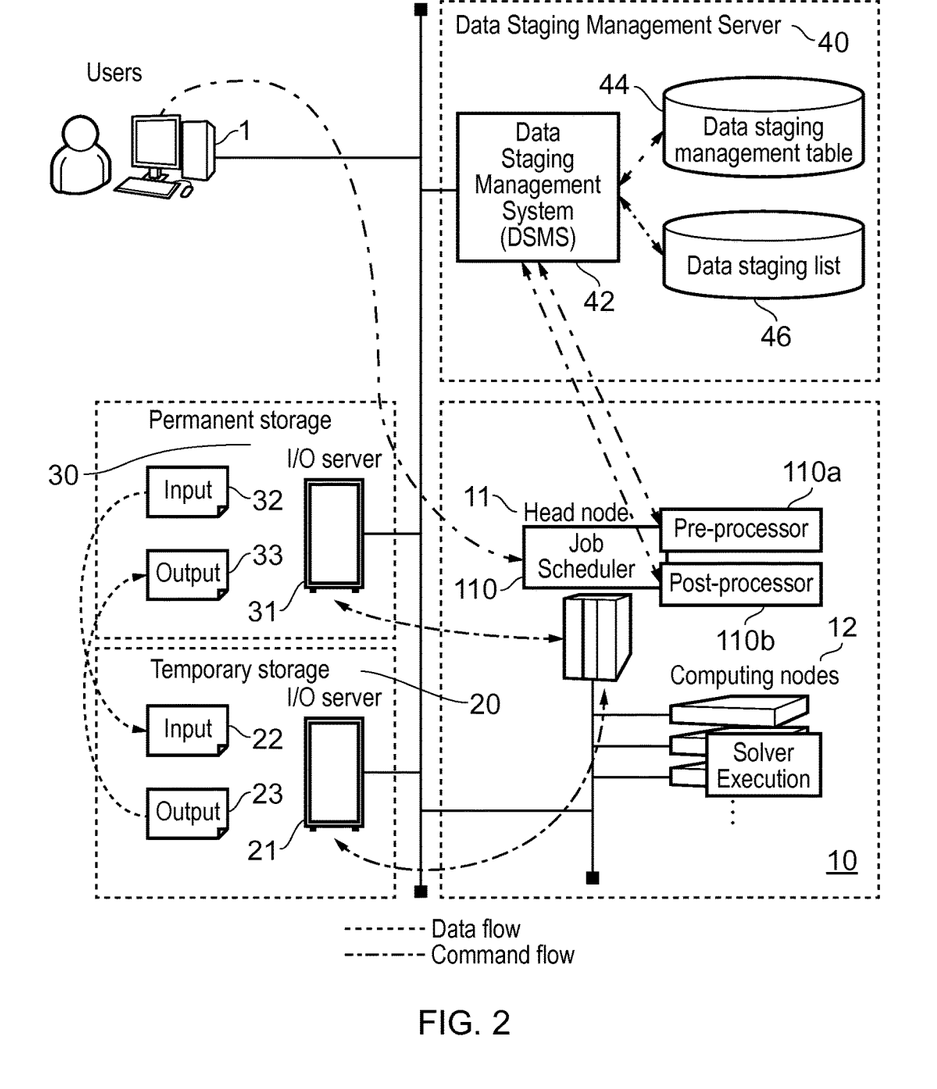
FIG. 2 shows a system overview of a computing system embodying the present invention.

FIG. 2 shows a system overview. Corresponding parts to those in FIG. 1 have the same reference signs. The newly-added components are shown in black with white labels. Most notably, there is a data staging management server 40 additionally connected to the network 5, and comprising a data staging management system or DSMS 42, a data staging management table 44, and a staging list 46. Henceforth, references to the DSMS imply operations performed in the data staging management server 40, employing the staging status table 44 and staging list 46 as appropriate. The DSMS 42 is capable of issuing commands directly to the temporary and permanent storages 20 and 30, or more precisely to the I/O servers 21 and 31.

In addition, the job scheduler 110 in head node 11 is newly equipped with a pre-processor 110a and a post-processor 110b arranged to communicate with the DSMS 42, as will be described below.

One task of the DSMS 42 running on server 40 is to classify data stage-in and stage-out into asynchronous/synchronous, and short-term/long-term categories. Although not shown in the Figure, DSMS 42 includes both internal and external stage-in initiators, and internal and external stage-out initiators, as programs running on the management server 40.

Figure 3:
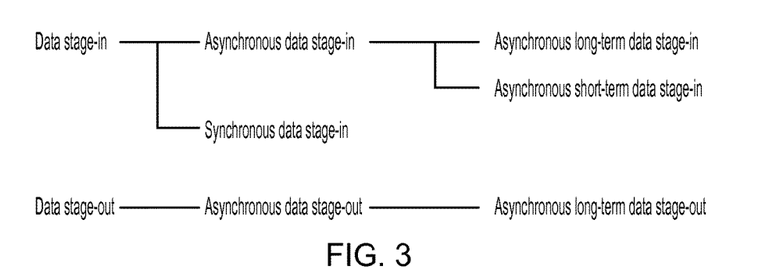
FIG. 3 shows a classification of data staging processing as used in an embodiment of the present invention.

FIG. 3 shows the classification of data staging processing defined in this embodiment. Depending on the timing when data stage-in processing is executed, it is classified as "Asynchronous data stage-in" or "Synchronous data stage-in". Furthermore, "Asynchronous data stage-in" is classified as either "Asynchronous long-term data stage-in" or "Asynchronous short-term data stage-in" in dependence on the predicted data staging period. "Here, "short term" and "long term" relate to how long the data transfer takes, not to how long data remains in the temporary storage. That is, "short term" refers to data staging of relatively short duration, and "long term" to data staging which takes a long time.

The predicted time for data staging processing (in seconds) can be calculated as the amount of staging data (in bytes) divided by the staging speed (in bytes per second), the staging speed being a parameter of the system and related to the I/O ability of the I/O servers 21 and 31. Multiple data staging processings—referred to below as "data staging jobs"—may be involved in the data staging of the same batch job, and as already mentioned the system 10 handles a queue of batch jobs in general. The result of such classifications (for the queue of batch jobs) is the data staging list 46 referred to above. The staging list 46 provides a schedule or running order for the data staging jobs of various batch jobs, and covers both data stage-in and data stage-out.

When a job is submitted to the system from a user, a batch job script as exemplified below is transmitted from the user workstation 1 to the head node 11. The pre-processor 110a in the form of a plug-in program to the job scheduler 110 is launched upon receipt of the batch job script. The pre-processor 110a parses the script to look for specific lines of code. At this stage, the pre-processing program 110a communicates with the DSMS 42 if the batch job script includes any portion (below, the lines "#DSMS—stage-in-cp" and "#DSMS—stage-out-cp") for data staging.

As already mentioned, data stage-in involves transfer of data from one or more storage area 32 in permanent storage, to a storage area 22 in the temporary storage. By identifying target files (also referred to as source files) or directories for data to transfer from storage area 32 to storage area 22, DSMS 42 manages data stage-in processing, constructing the data staging list 46 and executing it at an appropriate timing, recording the progress of the data stage-in within the data staging management table 44. As the execution of the batch job by computing nodes 12 proceeds, output results are generated and stored in storage area 23. After the batch job has completed execution, DSMS 42 manages data stage-out processing and executes it at an appropriate timing to transfer the processing results from temporary storage 20 to permanent storage 30, or more particularly from storage area 23 to storage area 33.

Here, the appropriate timing for the data stage-in (or data stage-out) depends on the predicted time taken to perform the data staging. Normally, data stage-in processing is carried out after the batch job request is submitted to the computing nodes 12. If the predicted time for data staging is short, it is carried out immediately before the batch job is executed (this is an example of synchronous data staging as referred to in the introduction). On the other hand, when it is predicted that data staging will take a long time, data staging is carried out based on a schedule which considers storage disk I/O performance. After staging in, if the target file is additionally modified, only the portion which has been modified is staged in, which is a form of asynchronous data staging. Thus, asynchronous data staging involves two types of staging processing to make more efficient use of I/O performance of the storage, the predicted time referred to earlier being used to classify the two types as short or long-term.

An example of the batch job script employed in the present invention is shown in the table below. In Line 012 and Line 014, the target files or directories for data staging are explicitly specified by the user with data staging commands:

| | | |
|---|---|---|
| #@$-q b016 | #Line 001 | : specifies queue |
| #@$-IP 16 | #Line 002 | : number of nodes |
| #@$-Ip 2 | #Line 003 | : number of process |
| #@$-IIm 64 mb | #Line 004 | : required memory per process |
| | #Line 005 | |

-continued

| | | |
|---|---|---|
| PATH=/opt/app/bin:$PATH | #Line 006 | |
| export PATH | #Line 007 | |
| APPDIR=/opt/app/bin | #Line 008 | |
| export APPDIR | #Line 009 | |
| cd $QSUB_WORKDIR | #Line 010 | |
| | #Line 011 | |
| stage-in-cp /home/userA/input/* | #Line 012 | : command for data "stage-in" processing |
| $APPDIR/isv-Z-p 32 | #Line 013 | : execution command of ISV application 2 |
| stage-out-cp /home/userA/output/* | #Line 014 | : command for data "stage-out" processing |

Figure 4:
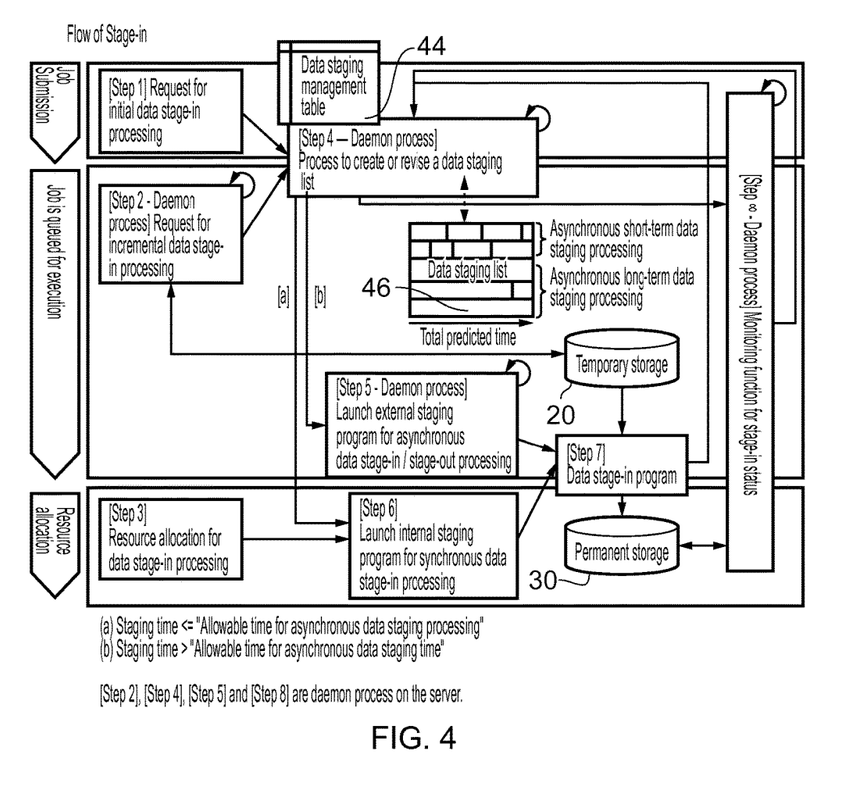
FIG. 4 shows data stage-in processing in an embodiment.
Figure 5:
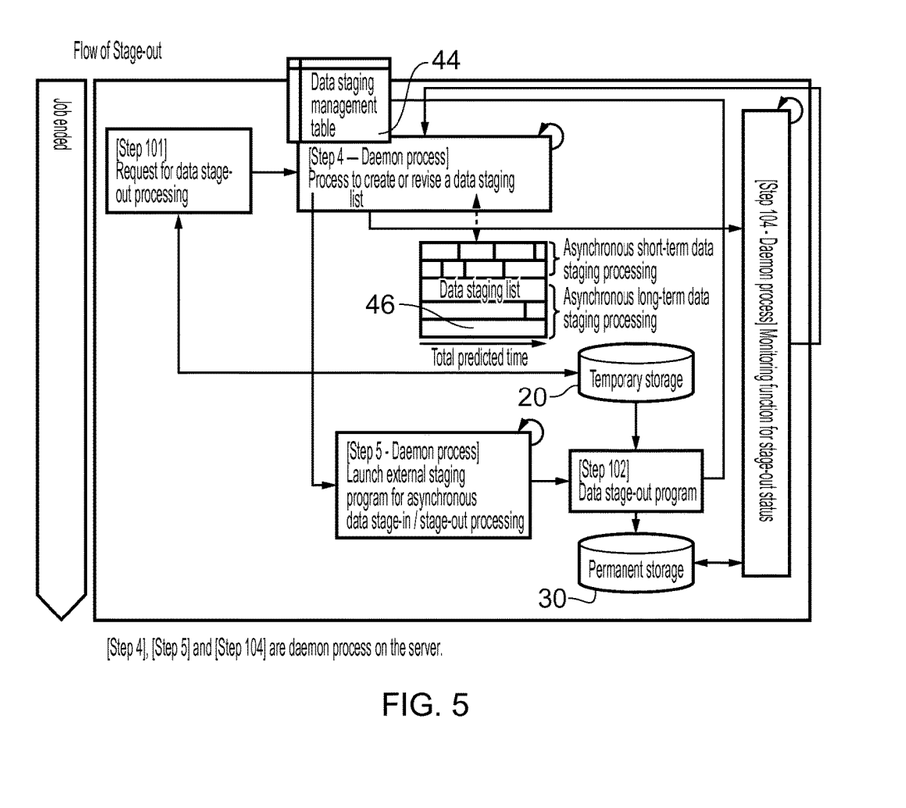
FIG. 5 shows data stage-out processing in an embodiment.

FIG. 4 shows the procedure followed by the DSMS 42 for data stage-in processing, and FIG. 5 shows the corresponding procedure for data stage-out processing. In each Figure, the vertical bands at the left-hand side denote successive phases of operation, individual steps of which are detailed to the right of each vertical band. The anticlockwise arrows denote that the steps concerned may be repeated. The numbering of the steps, namely [Step 1], [Step 2], etc. indicates the order in which the steps are performed. Substeps of each main step are denoted [Step 1-1], [Step 1-2] and so on. These steps will be detailed below.

The status of a data staging processing which is specified in a batch job script is recorded and updated in the data staging management table 44 until the execution including data staging processing is totally completed. A new entry is added to table 44 whenever data staging instructions are included in the batch job script, and picked up by preprocessor 100a. Each entry (row) in the table corresponds to one data staging processing or "data staging job". As already mentioned, there may be more than one data staging job for the same batch job: typically the same batch job will give rise to both stage-in and stage-out data staging jobs, although the stage-out job need not be entered into the table until after the batch job has executed. As already mentioned, synchronous data stage-in will start soon after the computing resources for the batch job have been reserved.

Table 1 below shows the format of the data staging management table 44.

TABLE 1

Data staging management table

| Identifiers | Items | Meanings |
|---|---|---|
| (a) | Batch job ID | Unique ID issued by a job scheduler. [values] e.g.) 35789 |
| (b) | Data staging phase | Data staging phase specified in a batch job script. The value is "stage-in" or "stage-out". [values] stage-in, stage-out |
| (c) | Data staging ID | This value is an integer number and counted up from 000. When DSMS accesses "Data staging management table", it retrieve an entity using "Batch job ID" and "Data staging ID" as a key. The initial value is 000. Using this value, it is possible for DSMS to know if the data staging status is in the initial data staging processing or incremental data staging processing. [values] e.g.) 003 |
| (d) | Data staging status | Status of data staging specified in a batch job script. [values] notstarted, ongoing, completed |
| (e) | Start time of data staging | Start time of data staging processing. [values] 12/Feb/2014 19:40:35 |

TABLE 1-continued

Data staging management table

| Identifiers | Items | Meanings |
|---|---|---|
| (f) | End time of data staging | End time of data staging processing. [values] 12/Feb/2014 20:30:15 |
| (g) | List of data staging target | Files or directories copied between temporary storage and permanent storage in a data staging processing. [values] e.g.) /home/userA/input/* |
| (h) | Total size of data staging target | Sum of the files or directories specified in (g). [values] e.g.) 12543278 bytes |
| (i) | Size of transferred data | Sum of the files or directories already transferred. [values] e.g.) 8987861 bytes |
| (j) | Size of remaining data | Sum of the files or directories which are not transferred yet [values] e.g.) 3555417 bytes |
| (k) | Predicted time for data staging processing | This is the predicted time to transfer the files or directories specified (g). [values] e.g.) 3678 sec |

Table 1 shows the items of management information recorded for each data staging job, or in other words one "row" of the management table 44.

Referring again to FIG. 4, operation of DSMS 42 during data stage-in processing is explained below. As indicated in FIG. 4, the process involves successive phases of (i) Job Submission; (ii) Queuing a job for execution; and (iii) Resource allocation. As indicated in FIGS. 4 and 5, some of the steps are performed by a "Daemon process" resident in the memory of a server, principally the data staging management server 40, and which runs in the background in a manner similar to a print spooler or e-mail handler. Examples of such Daemon processes include so-called "initiators" described later for conducting the actual data staging.

[Step 1]-[Step 3] each relate to one job, in other words they are performed separately for each job in turn. By contrast, [Step 4]-[Step 7] are carried out, generally, for multiple jobs at the same time. Finally, [Step 8] and [Step 9] apply to one job at a time.

[Step 1] Step 1 is job submission, that is, the phase to issue the request for initial data stage-in processing to DSMS from the pre-processor in a job scheduler. Table 2 shows data staging commands which can be recognized by DSMS.

TABLE 2

Commands specified in a batch script for a data staging processing.

| Commands | Meanings |
|---|---|
| stage-in-cp | This command is used to copy the input data of a batch job from permanent storage to temporary storage. |
| stage-out-cp | This command is used to copy the output data of a batch job from temporary storage to permanent storage. |

[Step 1-1] After a user submits a batch job script to a job scheduler, the pre-processor 110a of the job scheduler 110 communicates with DSMS 42. If the batch job script includes any of the above data staging commands, DSMS 42 analyzes the batch job script and sets a corresponding value into each attribute in one entry, or row, of a data staging management table 44 shown as Table 3 per data staging job. At this stage, data stage-in processing and job execution have not been started yet.

TABLE 3

Example of "Data staging management table" generated in [Step 1-1]

| Identifiers | Attributes | Values |
|---|---|---|
| (a) | Job ID | 76895 |
| (b) | Data staging type | stage-in |
| (c) | Data staging ID | 000 |
| (d) | Data staging status | notstarted |
| (e) | Start time of data staging | Undefined |
| (f) | End time of data staging | Undefined |
| (g) | List of data staging target | /home/userA/input/* |
| (h) | Total size of data staging target | 12543278 |
| (i) | Size of transferred data | 0 |
| (j) | Size of remaining data | 12543278 |
| (k) | Predicted time for data staging processing | Undefined |

In this step, values in the attributes (a)-(d) and (g)-(j) are set, namely:-
(a) Job ID issued by a job scheduler is set.
(b) "stage-in" is set.
(c) Initial value "000" is set as the initial value.
(d) "notstarted" is set because data staging has not yet started at this stage.
(g) DSMS 42 looks into the batch job script and enters here the name (path) of the source files (target data staging files) or directories if any.
(h) Based on (g), DSMS calculates the total size of data staging target (i.e. the amount of data to be transferred) and sets the value.
(i) Because no data staging target is transferred at this stage, "0" is set.
(j) Because no data staging target is transferred at this stage, the same value as set in (h) is entered here.

In this step, values in the attributes (a)-(d) and (g)-(j) are set, namely:—

[Step 2] During phase (ii), Job queued for execution, the batch job waits in the queue while other jobs (submitted earlier or having higher priority) are executed. During this phase, it is possible that source data is modified. Step 2 is the processing to issue the request for incremental data stage-in processing to DSMS 42 from the pre-processor 110a.

[Step 2-1] As to the data staging job whose "Staging status" is "completed" on data staging management table 44, the DSMS 42 checks if target files or directories are modified after the start time of data stage-in processing.

[Step 2-2] If target files or directories are modified after the start time of data stage-in processing, DSMS can detect this from the "time last modified" value of the file or directory attributes. Then a new entry is inserted in the data staging management table 44, in which the Job ID is the same, but an increment 1 is added to the value of "Data staging ID". This means that whenever DSMS finds that target files or directories are modified, a new entry to indicate an incremental data staging is added to the table. In this case, the following values are set as a new entry in the data staging management table 44 as shown in Table 4:

TABLE 4

Example of "Data staging management table" modified in [Step 2-2]

| Identifiers | Attributes | Values |
|---|---|---|
| (a) | Job ID | 76895 |
| (b) | Data staging phase | stage-in |
| (c) | Data staging ID | 001 |
| (d) | Data staging status | notstarted |
| (e) | Start time of data staging | Undefined |
| (f) | End time of data staging | Undefined |
| (g) | List of data staging target | /home/userA/input/inputdata_1 /home/userA/input/inputdata_3 |
| (h) | Total size of data staging target | 673213 |
| (i) | Size of transferred data | 0 |
| (j) | Size of remaining data | 673213 |

TABLE 4-continued

Example of "Data staging management table" modified in [Step 2-2]

| Identifiers | Attributes | Values |
|---|---|---|
| (k) | Predicted time for data staging processing | Undefined |

(c) DSMS adds 1 to existing value. If "000" is already set here, DSMS modifies this value to "001".
(d) "notstarted" is set in order to transfer modified target files and directories.
(g) DSMS looks into the batch job script and set the files or directories which are modified after the start time of data staging.
(h) Based on (g), DSMS calculate the total size of (g).
(i) Because modified files or directories are not transferred at this stage, "0" is set.
(j) Because modified files or directories are not transferred at this stage, same value set in (h) is set.

[Step 3] Phase (iii) in FIG. 4 is resource allocation. To allocate computing resources to a batch job, the job scheduler refers to the status of available computing nodes. This process is called "Resource management". Adding the following stage-in judgment condition into resource management function, the resource management function controls the allocation of computing nodes for executing the batch job.

[Step 3-1] In the data staging management table 44, if there is a job where the value of "Status of staging" is "completed" or both the value of "Status of staging" is "ongoing" and the value of "Predicted time for data staging processing" is equal or less than "Threshold time for asynchronous data staging", a resource management function in the job scheduler decides to allocate computing resource to the job. The plug-input signal pre-processor 110a and post-processor 110b installed in the job scheduler 110, periodically communicate with the DSMS 42 and this can alert the job scheduler when the above situation arises.

[Step 4] Process to create or revise the data staging list 46 in order to manage asynchronous data staging processing. The data staging list 46 is formed by a daemon process on the server 40 from the data staging management table 44 and covers all batch jobs for which data staging is required. As indicated in FIGS. 4 and 5, the data staging list 46 includes sections for asynchronous short-term data staging processing, and asynchronous long-term data staging processing.

As to the data stage-in processing, according to "Predicted time for data staging processing", the DSMS 42 classifies data staging jobs to "Asynchronous long-term data staging" or "Asynchronous short-term data staging". Depending on the capacity of I/O servers 21 and 31, and the demands of the data staging jobs, it may be possible to performs multiple data staging processings in parallel. The number of such parallel staging processes is referred to as a "multiplicity" below. As to the data stage-out processing, the data staging job is automatically classified to "Asynchronous long-term data staging".

Figure 6:
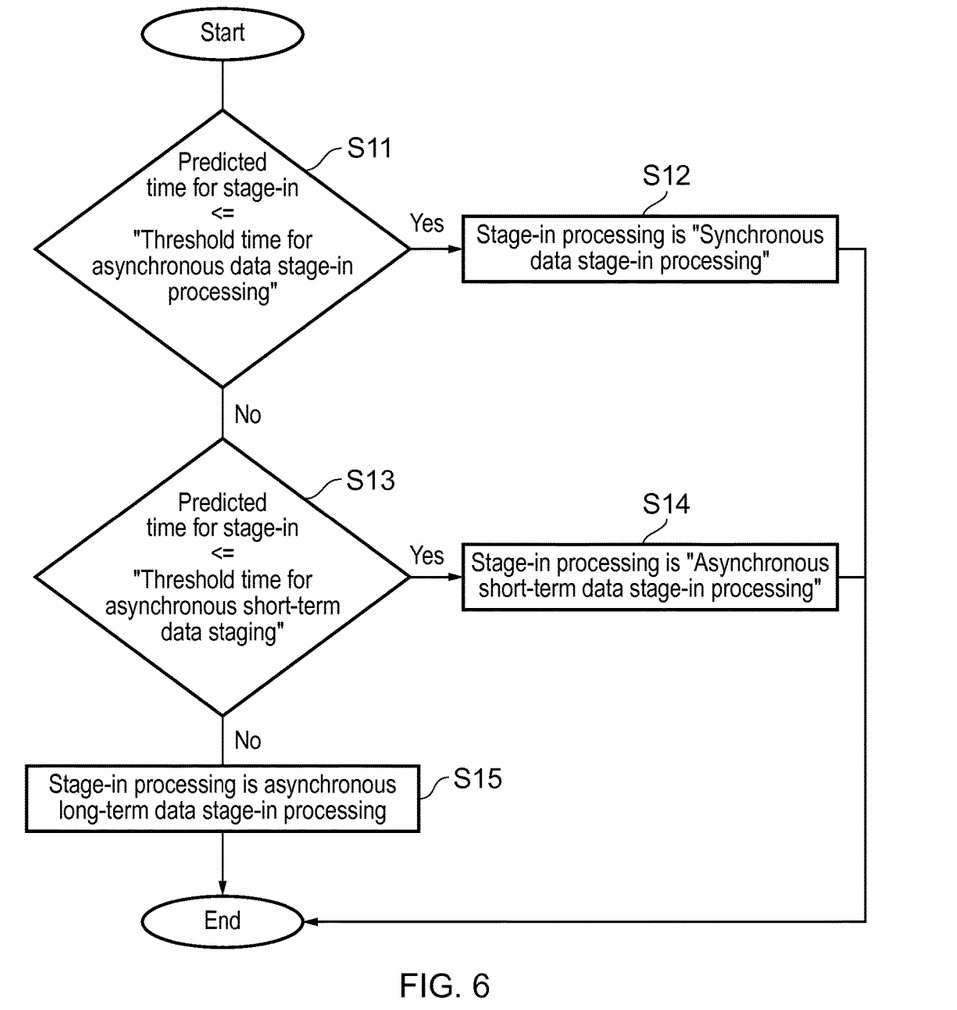
FIG. 6 is a flowchart of steps in a process of classifying data stage-in in an embodiment.

FIG. 6 shows the flow to classify data stage-in processing for one batch job.

In step S11, it is checked whether the predicted time for data stage-in is less than or equal to a first threshold value ("Threshold time for asynchronous data stage-in processing"). If it is, (S11, YES), flow proceeds to a step S12 in which the data stage-in is set to synchronous data stage-in processing, and the classification process ends. As already mentioned, synchronous data stage-in is carried out immediately before the batch job is executed.

On the other hand, if the result of the comparison in S11 is negative (S11, "No") then flow continues to step S13 where it is checked whether the predicted duration of the data stage-in is less than or equal to a second threshold value, namely a "Threshold time for asynchronous short-term data staging".

If it is (S13, Yes), flow proceeds to S14 where the data stage-in is classified as asynchronous short-term data stage-in processing, and the process ends.

On the other hand, if the predicted time for stage-in exceeds the second threshold value (S13, "No") then the data stage-in is set as asynchronous long-term data stage-in in step S15, and the process ends.

[Step 4-1] In the data staging management table 44, if there are the entries where the value of "Status of staging" is anything but "completed", DSMS 42 calculates the predicted time for data stage-in processing and set it to the value of "Predicted time for data staging processing". The predicted time is estimated using formula (1) as follows:—

$$\text{"Predicted time [Second]"} = \text{"Size of remaining data [Byte]"} / \text{System parameter "Staging speed [Byte per second]"}. \quad (1)$$

[Step 4-2] From data staging management table 44, DSMS 42 calculates the sum of each "Predicted time" and sets it to the value of "Total predicted time" attribute.

[Step 4-3] Normally, a maximum time allowed for data staging is a system parameter set by a system administrator, as a "Maximum map time". If the value of "Total predicted time for data staging processing" exceeds the value of system parameter "Maximum map time", DSMS 42 sets the value of "Total predicted time for data staging processing" to the value of "Maximum map time". This is to set a threshold value on "Total predicted time for data staging processing".

The data staging list 46 is constructed as follows.

[Step 4-4] In the data staging management table 44, from the entries where the value of "Staging phase" is "stage-in", the DSMS 42 selects the entries where the value of "Predicted time for data staging processing" exceeds "Threshold time for asynchronous data staging" and the system parameter is less than "Threshold time for asynchronous short-term data staging". Then, the DSMS 42 makes the list of "Asynchronous data staging" jobs.

[Step 4-5] DSMS calculates the sum of "Predicted time for data staging processing" in the list of "Asynchronous data staging jobs". Then, DSMS sets this value as the value of "Predicted time for asynchronous short-term data staging processing" in the data staging management table 44.

[Step 4-6] This embodiment uses the concept of "multiplicity", which is the number of data staging jobs capable of being processed at the same time. Data staging jobs are dispatched cyclically to the I/O servers 21 and 31, based on the data staging list 46. The DSMS sets the following value into the value of "Multiplicity for asynchronous short-term data staging processing":

$$\text{"Multiplicity for asynchronous short-term data staging processing"} = \text{"Total predicted time for data staging processing [second]"} / \text{"Predicted time for asynchronous short-term data staging processing [second]"} \quad (2)$$

Here, fractions are rounded up (so 1.333 becomes 2 for example). The above formula is applied both to data stage-in and data stage-out.

Figure 7:
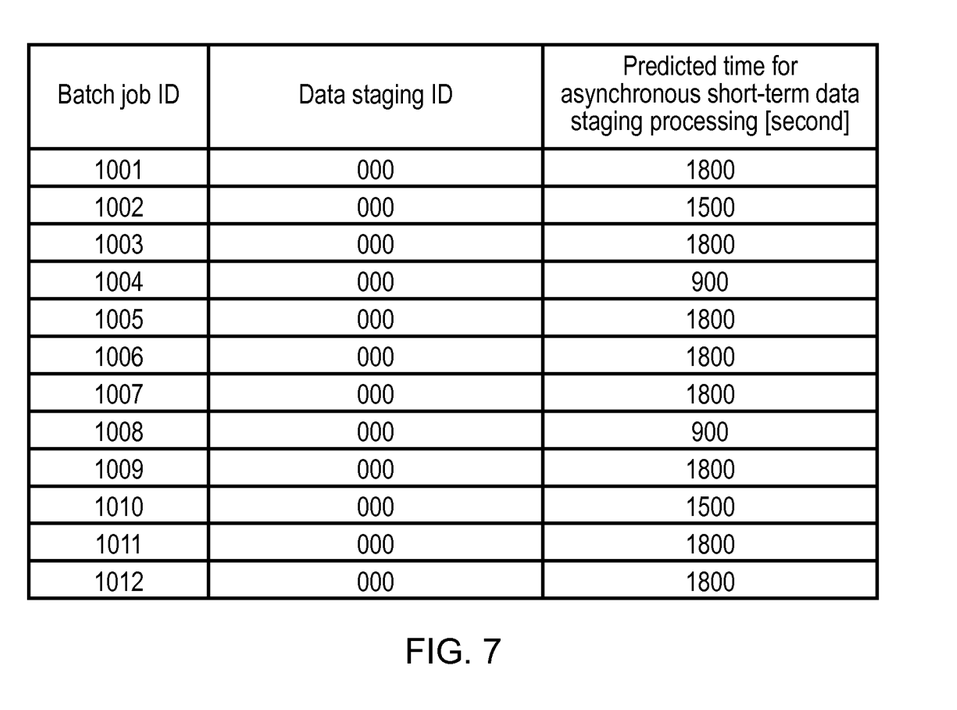
FIG. 7 shows an example of a data staging management table employed in an embodiment.
Figure 8:
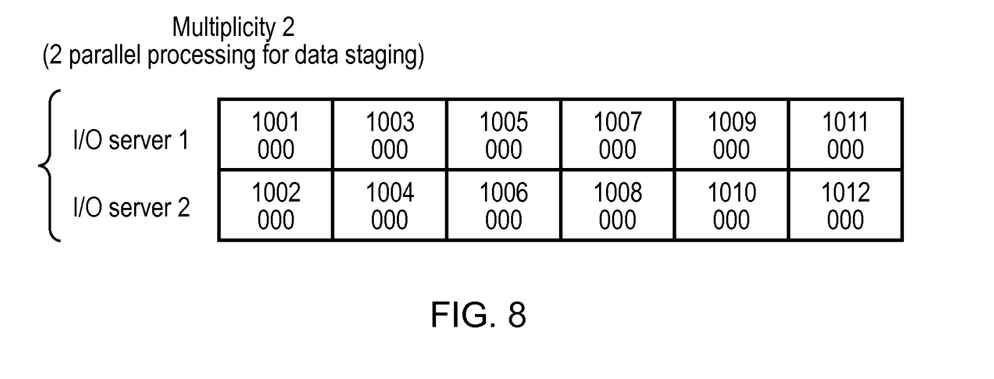
FIG. 8 illustrates alignment between two data staging jobs.

Refer to the example of FIG. 7, which shows part of the data staging management table 44 (more particularly, just the items (a) (b) and (k) from Table 1 above). The "Total predicted time for data staging processing" is either the sum of each "Predicted time for data staging processing" or (if this value would exceed the Maximum map time), is set to the "Maximum map time". This example assumes that "Total predicted time for data staging processing" is 14400 [second].

That is, based on the above data staging management table 44 of FIG. 7, "Total predicted time for data staging processing" becomes 19200 [second] from the sum of each "Predicted time for asynchronous short-term data staging processing". However, since this exceeds the maximum allowed value (threshold value) set by "Maximum map time", the latter value—14400 [second]—is used instead.

Using the formula (2) above,

"Multiplicity for asynchronous short-term data staging processing"=19200 [second]/14400 [second]=1.333 . . . =2

[Step 4-7] According to the value of "Multiplicity for asynchronous short-term data staging processing", the DSMS 42 aligns each entry of "Asynchronous short-term staging processing" list into data staging list 46 as asynchronous short-term staging processing.

Looking at the example introduced in [Step 4-6], data staging jobs managed in data staging management table 44 is aligned to data staging list 46 with the multiplicity of 2 as FIG. 7 shows.

[Step 4-8] For the entries where the value of "Data staging status" is "stage-in" in data staging management table 44, the DSMS 42 selects the entries whose value of "Predicted time for data staging processing" exceeds "Threshold time for asynchronous short-term data staging" and aligns each entry into data staging list 46 as asynchronous long-term staging.

[Step 4-9] From data staging management table 44, DSMS selects the entries where the value of "Data staging phase" is "stage-out" and aligns each entry into data staging list 46 as asynchronous long-term staging.

[Step 5] The next step is to launch an "External stage-in initiator" which is a Daemon process on server 40 for asynchronous stage-in processing. Incidentally, although the following discussion describes short-term asynchronous data stage-in first, in fact the data staging takes place on a "first-in, first-out" policy regardless of whether it is short-term or long-term.

[Step 5-1] This is for <asynchronous><short-term> data stage-in processing.

[Step 5-1-1] Using data staging management table 44, the DSMS 42 confirms the number of asynchronous data staging processings (data staging jobs) and compares its value with the value of "Multiplicity for asynchronous short-term data staging processing" in data staging list 46.

[Step 5-1-2] This is for <asynchronous><short-term> data staging processing. As to the short-term data staging jobs in the data staging list 46, until the number of "Multiplicity for asynchronous short-term data staging processing" has reached the upper limit, the DSMS 42 selects the staging jobs where the value of "Data staging phase" is "stage-in" and "Data staging status" is "notstarted". Then, "External stage-in initiator" calls "Data stage-in program", providing the parameters "Batch job ID" and "Data staging ID" from DSMS.

[Step 5-2] This is for <asynchronous><long-term> data stage-in processing.

[Step 5-2-1] From data staging management table 44, from the list of asynchronous long-term staging job on data staging list 46, DSMS selects the data staging jobs where the value of "Data staging phase" is "stage-in" and "Data staging status" is "notstarted". Then, the External stage-in initiator of DSMS 42 calls a data stage-in program, providing the parameters "Batch job ID" and "Data staging ID" from the DSMS 42.

[Step 6] This is for <synchronous> data stage-in processing to launch the above mentioned Internal stage-in initiator.

[Step 6-1] From data staging management table 44, DSMS 42 selects the staging jobs where the value of "Batch job ID" matches given parameter and the value of "Predicted time for data staging processing" is equal or less than "Threshold time for asynchronous data staging", which as already mentioned is the criterion to set synchronous stage-in. Then, the Internal stage-in initiator within DSMS 42 calls the data stage-in program with the parameters "Batch job ID" and "Data staging ID".

[Step 7] Data stage-in program

[Step 7-1] A Data stage-in program receives "Batch job ID" and "Data staging ID" from the External stage-in initiator or the Internal stage-in initiator of DSMS 42.

[Step 7-2] DSMS sets "ongoing" into the value of "Data staging status" for the entries where the values of "Batch job ID" and "Data staging ID" are matched with given parameters in the data staging management table 44.

[Step 7-3] The DSMS 42 refers to the target files or directories specified in "List of data staging target" of the entries specified in [Step 7-2]. Then, the DSMS (via the head node 11) copies target files or directories on permanent storage 30 to temporary storage 20.

[Step 7-4] After the copy processing is completed, DSMS sets "0" as the value of "Predicted time for data staging processing" and "Completed" as the value of "Data staging status" from the entries where the values of "Batch job ID" and "Data staging ID" are matched with the given parameters in data staging management table 44.

[Step 8] Process to monitor data stage-in status

[Step 8-1] In data staging management table 44, from the entries where "Data staging phase" is "stage-in" and "Data staging status" is "ongoing", the DSMS 42 refers to the target files or directories recorded in item (g), "List of Data staging target". This is carried out continuously as a Daemon process on the server. Then, this monitoring process calculates the total file size of transferred data and sets the value into the value of "Size of transferred data".

[Step 8-2] For the entries specified in [Step 8-1], the data DSMS calculates the following formula (3) and sets it as the value of "Size of remaining data" attribute.

Size of remaining data [Byte]=Total size of data staging data [Byte]−Size of transferred data [Byte]   (3)

[Step 9] Process to start a batch job

[Step 9-1] In a job execution directory on the temporary file system 20, DSMS makes a time-stamp file and sets the current date and time as the last modified date.

The above explanation referred to the data stage-in according to FIG. 4. The corresponding sequence of steps for data stage-out will now be explained referring to FIG. 5.

In FIG. 5, there is only one "phase" in terms of the system operation as a whole—namely, execution of the job must have completed as indicated by "Job ended" at the left-hand side.

[Step 101] Request for data stage-out

[Step 101-1] When a batch job is completed, the following information in Table 5 is set in data staging management table 44 so as to set up the data staging job for data stage-out. Table 5 below contains the same information as Table 1, but is presented here in somewhat abbreviated form.

TABLE 5

Example of Data staging management table generated in [Step 101-1]

| Identifiers | Attributes | Values |
|---|---|---|
| (a) | Job ID | 76895 |
| (b) | Data staging phase | stage-out |
| (c) | Data staging ID | 000 |
| (d) | Data staging status | notstarted |
| (e) | Start time of data staging | Undefined |
| (f) | End time of data staging | Undefined |
| (g) | List of data staging target | /home/userA/output/outputdata_10 /home/userA/output/outputdata_12 |
| (h) | Total size of data staging target | 1005673213 |
| (i) | Size of transferred data | 0 |
| (j) | Size of remaining data | 1005673213 |
| (k) | Predicted time for data staging processing | Undefined |

(a) Job ID issued by a job scheduler is set.
(b) "stage-out" is set.
(c) Initial value "000" is set as the initial value.
(d) "notstarted" is set because data staging is not started at this stage.
(g) DSMS looks into the batch job script and put the target data staging files or directories if any.
(h) Based on (g), DSMS calculate the total size of data staging target and set the value.
(i) Because no data staging target is transferred at this stage, "0" is set.
(j) Because no data staging target is transferred at this stage, same value set in (h) is set.

Since [Step 101] adds an entry to the data staging management table 44, this also prompts a revision of the data staging list 46, as in [Step 4] explained above with respect to data stage-in.

[Step 102] Process to launch external stage-out program for asynchronous staging

[Step 102-1] From data staging management table 44, from the entries where the value of "Data staging phase" is "stage-out", the DSMS—or more particularly the external data stage-out initiator—selects data stage-out processing where the value of "Data staging phase" is "stage-out" and the value of "Data staging status" value is "notstarted", and then it launches an external stage-out program. This data stage-out program is launched with the parameter of "Batch job ID" and "Data staging ID".

[Step 103] Internal stage-out program

[Step 103-1] From the given parameter, the internal stage-out program (or initiator) acquires the values of "Batch job ID" and "Data staging ID".

[Step 103-2] From data staging management table 44, the DSMS 42 sets "ongoing" as the value of "Data staging status" for the entries where "Batch job ID" and "Data staging ID" are matched with the given parameters.

[Step 103-3] DSMS refers to the target files or directories specified in "Data staging target" of the entries specified in [Step 103-2].

[Step 103-4] DSMS copies the files or directories specified in [Step 103-3] which are modified only after the date specified in the time-stamp file, from temporary storage 20 to permanent storage 30.

[Step 103-5] After the copy is completed, the DSMS 42 sets "0" as the value of "Predicted time for data staging processing" and "completed" as the value of "Data staging status" for the entries where "Batch job ID" and "Data staging ID" are matched with given parameters in data staging management table 44.

[Step 104] Process to monitor data stage-out status

[Step 104-1] In data staging management table 44, from the entries where the value of "Data staging type" is "stage-out" and the value of "Data staging status" is "ongoing", DSMS refers to the target files or directories from item (g)

in table 44, "List of data staging target". Then, this process calculates the total file size of transferred data (i.e., data transferred so far) and sets the number into the value of "Size of transferred data".

[Step 104-2] For the entries specified in [Step 104-1], DSMS calculates formula (3) as used in data stage-in, and sets it into the value of "Size of remaining data":—

$$\text{Size of remaining data [Byte]} = \text{Total size of data staging target [Byte]} - \text{Size of transferred data [Byte]} \quad (3)$$

Once a data staging job is complete (0 bytes remaining) the job can be deleted from the data staging list 46.

This completes the explanation of the data stage-out process.

Thus, to summarize embodiments of the present invention provide a data staging technique when executing batch jobs in a HPC system, combining synchronous and asynchronous data staging processing. In a pre-processor 110a added to a head node of the HPC system 10, at least one target file as a source file for data stage-in, and a target file for data stage-out, both held in permanent storage 30, are identified for example by analyzing a batch job script to input at a user workstation 1. From amounts of data contained in the files, a time required for data stage-in and data stage-out to and from temporary storage 20 are estimated. Data stage-in is set as asynchronous or synchronous based on the estimated time, data stage-out being treated as asynchronous, and each asynchronous data staging processing is further classified as short-term or long-term depending on the estimated time required, each data staging processing being recorded in a data staging management table 44. If a source file is modified, incremental data staging processing is added to the table. Depending the data amounts involved and time allowed, data staging jobs may be set to run in parallel; otherwise, data staging jobs are queued. The data stage-in of the source file(s) from the permanent storage 30 is performed, monitoring progress of data staging processing in the data staging management table 44. Resources are allocated for executing the batch job using computing nodes 11 without waiting for data stage-in to complete. The batch job is executed to generate results in the temporary storage 20, and with the aid of a post-processor 110b at the head node 11, data stage-out is performed to transfer the results to the target file in the permanent storage 30.

Various modifications are possible within the scope of the invention.

Although one sequence of steps has been described in the above embodiment, this is not necessarily the only possible sequence, and operations may be performed in a different order so long as the overall effect is equivalent.

In the above embodiment, the External and Internal initiators for data stage-in and data stage-out run on the management server 40. However, operations described as requiring an External or Internal initiator, or program, can be performed anywhere in the computing system, in general.

Although the above Initiators have been described as working with data stage-in or data stage-out programs, these functions can be combined. That is the initiator may itself conduct the stage-in or stage-out as the case may be.

Similarly, in the above described embodiment, the DSMS 42 is described as running on server 40 which is separate from head node 11 and computing nodes 12. However, this is not essential and the DSMS may be implemented in the head node 11, in a computing nodes 12, or in any other node within or outside the HPC system 10; moreover it may be distributed among a plurality of such nodes. Use of a separate server 40 is preferred from the viewpoint of fault-tolerance and resiliency.

INDUSTRIAL APPLICABILITY

By combining synchronous and asynchronous data staging, embodiments of the present invention allow batch jobs to be executed sooner, avoiding inefficient use of computing resources.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of managing data staging, when executing, batch jobs in a computing system, comprising, for each batch job:
    identifying at least one source file for data stage-in and at least one target file for data stage-out;
    determining amounts of data to be transferred in data stage-in and data stage-out and estimating a time required to complete data transfer in data stage-in and data stage-out respectively;
    setting, as a first data staging processing for the batch job, one of asynchronous and synchronous data stage-in based on the estimated time required for the data stage-in, and setting, as a second data staging processing for the batch job, asynchronous data stage-out, wherein the asynchronous data stage-in is carried out independently from resource allocation process without securing resources required for execution of the batch job and the synchronous data stage-in is carried out after securing the resource allocation for execution of the batch job, wherein the asynchronous data stage-out is carried out independently from resource allocation process;
    performing data stage-in from the at least one source file and allocating resources for performing the batch job;
    executing the batch job to generate results; and
    performing data stage-out of the results to the target file.

2. The method according to claim 1, further comprising:
    classifying the first data staging processing as one of asynchronous short-term and asynchronous long-term data stage-in according to the estimated time required for the data stage-in; and
    classifying the second data staging processing as one of asynchronous short-term and asynchronous long-term data stage-out according to the estimated time required for the data stage-out.

3. The method according to claim 2, wherein the setting of the one of asynchronous and synchronous data stage-in is made by comparing the estimated time required for the data stage-in with a threshold value, and the allocating resources is performed once a remaining time to complete the data transfer is within the threshold value.

4. The method according to claim 3, further comprising:
    setting a maximum time for one of data stage-in and data stage-out;
    calculating a multiplicity of respective data stage-in and data stage-out based on the maximum time; and
    performing the respective data stage-in and data stage-out of a plurality of batch jobs simultaneously with a number of data staging processings equal to said multiplicity.

5. The method according to claim 4, wherein the setting the maximum time includes forming a data staging management table recording each data staging processing and a status of each data staging processing.

6. The method according to claim 5, further comprising:
while performing data stage-in, checking whether the source file has been modified since a start of data stage-in and if so, setting an incremental data stage-in as an additional data staging processing in the table.

7. The method according to claim 6, wherein the data staging management table contains, for each data staging processing, initial information including:
an identifier of the batch job for which the data staging processing is set;
an indication of whether the data staging processing is the respective data stage-in and data stage-out;
a location of each source file and target file; and
an amount of data to be transferred.

8. The method according to claim 7, wherein the initial information is obtained by analyzing a batch job script to perform said identifying and estimating.

9. The method according to claim 8, wherein the data staging management table contains, for each data staging processing, further information including:
an indication of whether the data staging processing is an incremental data stage-in;
whether the data staging processing is one of has not started, is ongoing, and has completed;
a start time of data staging processing;
an end time of data staging processing; and
one of an amount of data so far transferred and an amount of data remaining to be transferred; and
an estimated time required for the data staging processing.

10. The method according to claim 9, further comprising constructing, on a basis of the data staging management table, a data staging list for scheduling data stage-in or data stage-out of a plurality of batch jobs.

11. A data staging manager for managing data staging, in a computer system executing batch jobs, the data staging manager arranged to, for each batch job:
identify at least one source file for data stage-in, and at least one target file for data stage-out;
determine amounts of data to be transferred in data stage-in and data stage-out and estimate a time required for data transfer in data stage-in and data stage-out, respectively;
set, as a first data staging processing for the batch job, one of asynchronous and synchronous data stage-in based on the basis of the estimated time required for the data stage-in, and set, as a second data staging processing for the batch job, asynchronous data stage-out, wherein the asynchronous data stage-in is carried out independently from resource allocation process without securing resources required for execution of the batch job and the synchronous data stage-in is carried out after securing the resource allocation for execution of the batch job, wherein the asynchronous data stage-out is carried out independently from resource allocation process;
perform data stage-in from the at least one source file;
communicate with a job scheduler of the computer system to initiate allocation of resources to the batch job and execution of the batch job; and
perform data stage-out of results to the target file.

12. The data staging manager according to claim 11, comprising a data staging management server, coupled to a pre-processor and a post-processor installed in the job scheduler of the computer system, the pre-processor arranged to analyze a batch job script received by the job scheduler.

13. The data staging manager according to claim 12, wherein the data staging management server includes a data staging management table recording, for each data staging processing:
an identifier of the batch job for which the data staging processing is set;
an indication of whether the data staging processing is one of data stage-in and data stage-out;
a location of each source file and target file;
an amount of data to be transferred;
an indication of whether the data staging processing is an incremental data stage-in;
whether the data staging processing is one of has not started, is ongoing, and has completed;
a start time of data staging processing;
an end time of data staging processing;
one of an amount of data so far transferred and an amount of data remaining to be transferred; and
an estimated time required.

14. A non-transitory computer-readable recording media on which is recorded a computer program containing computer-readable instructions which, when executed by a server in a computer system, perform the method according to claim 1.

* * * * *

UNITED STATES PATENT AND TRADEMARK OFFICE
CERTIFICATE OF CORRECTION

PATENT NO. : 10,013,288 B2
APPLICATION NO. : 14/927630
DATED : July 3, 2018
INVENTOR(S) : Hideaki Kuraishi et al.

Page 1 of 1

It is certified that error appears in the above-identified patent and that said Letters Patent is hereby corrected as shown below:

In the Specification

Column 1, Line 7:
Delete "U.S." and insert --European--, therefor.

Signed and Sealed this
Nineteenth Day of February, 2019

Andrei Iancu
*Director of the United States Patent and Trademark Office*